2 Sheets--Sheet 1.

A. A. WOOD.
Hollow Augers.

No. 166,673. Patented Aug. 10, 1875.

Witnesses
N. E. Robinson
George S. Balloch

Inventor
Albert A. Wood

2 Sheets--Sheet 2.
A. A. WOOD.
Hollow Augers.
No. 166,673. Patented Aug. 10, 1875.
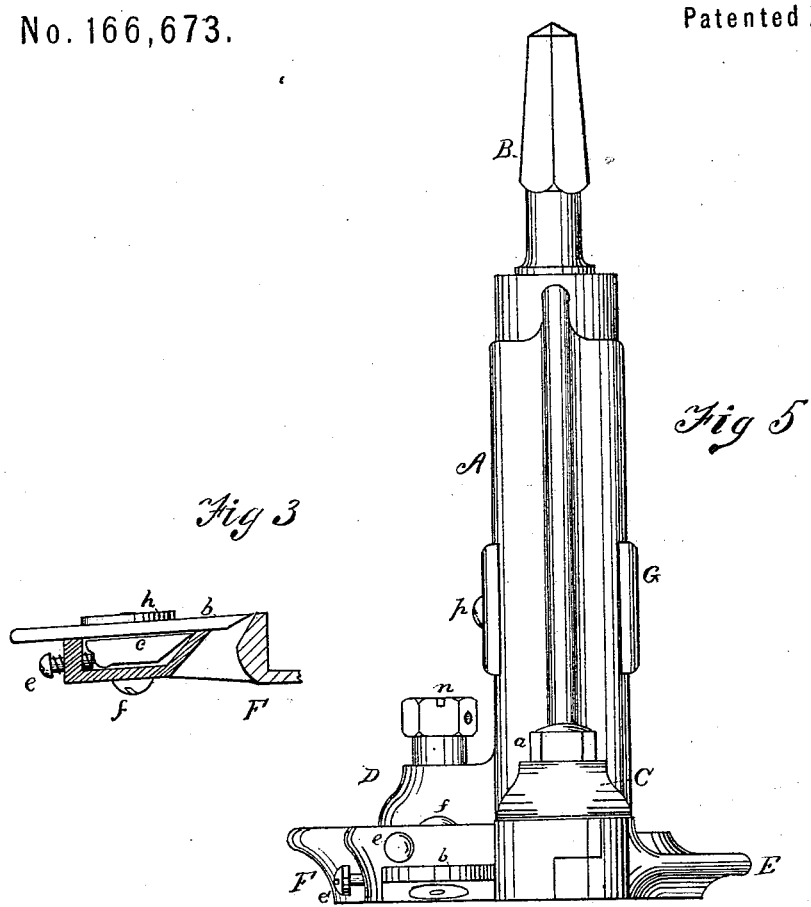
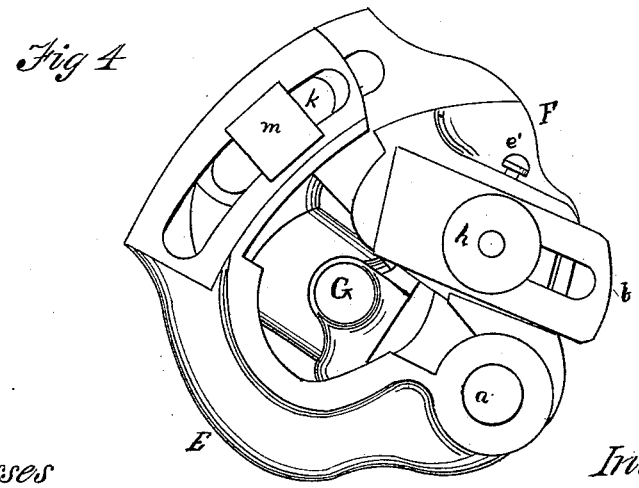
Witnesses
N. E. Robinson
George A. Bullock
Inventor
Albert A. Wood

UNITED STATES PATENT OFFICE.

ALBERT A. WOOD, OF MANLIUS, NEW YORK.

IMPROVEMENT IN HOLLOW AUGERS.

Specification forming part of Letters Patent No. 166,673, dated August 10, 1875; application filed July 31, 1875.

*To all whom it may concern:*

Be it known that I, ALBERT A. WOOD, of Manlius, in the county of Onondaga, State of New York, have invented a new and useful Improvement in Hollow Augers for forming the tenons upon the outer ends of wagon-spokes, chair-rounds, or other similar articles; and I hereby declare the following to be such a full, clear, and exact description as will enable others skilled in the art to which it pertains to construct the same, reference being had to the accompanying drawings making a part of this specification, and to the letters of reference marked thereon, similar letters indicating corresponding parts in the different figures.

This invention relates to that class of hollow augers which are designed for forming tenons of different sizes by one and the same auger, the object being to avoid the necessity of having an auger especially constructed for each tenon, differing in its diameter from another, experience having also demonstrated that it is very difficult to procure boring-bits which will fit a fixed size of hollow auger, as the gages of different makers of boring-bits are so various as to make an essential difference in the diameter of the hole bored by the same gage of auger made by different makers; and the invention consists in the construction and arrangement of the different parts, as will be hereinafter fully described, and then specifically set forth in the claims.

Figure 1:
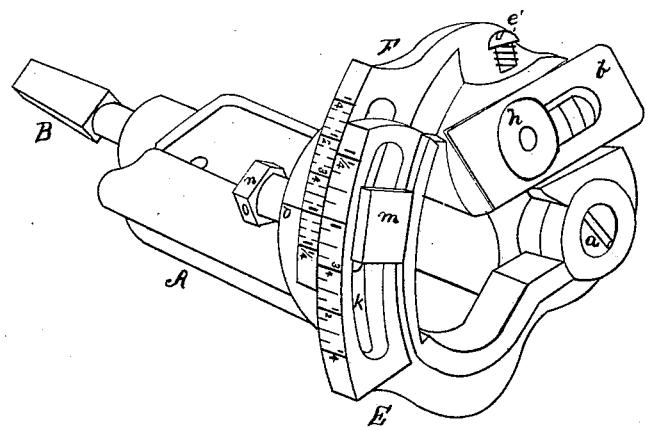
Figure 2:
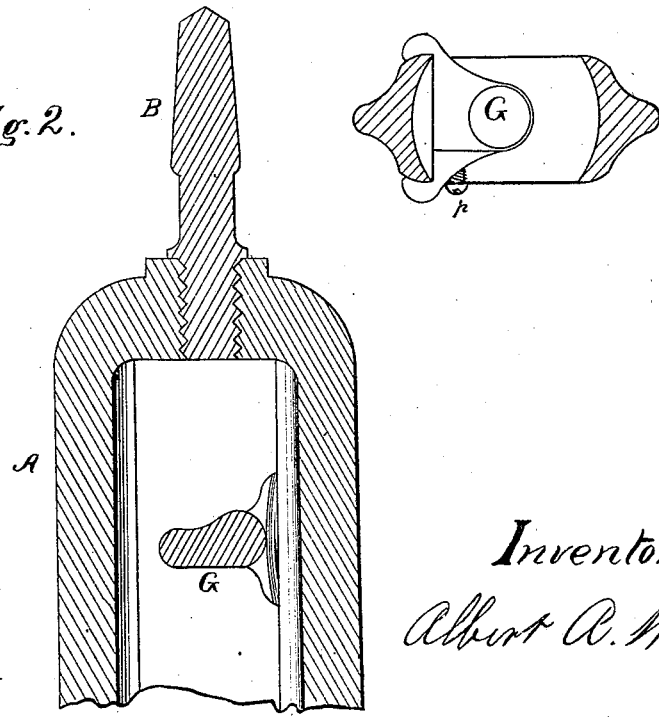

In the drawings, Figure 1 is a perspective view of the tool complete. Fig. 2 represents sections of the body in the rear of the jaws, and showing the stop and its attachments. Fig. 3 is a section or view of one of the jaws, showing the devices for adjusting the cutter. Fig. 4 is a face or front view of the jaws, cutter, and stop. Fig. 5 is a side view, showing the pivoted jaws and the clamps which secure the stop.

The metallic body of the auger is shown at A, and it is provided with a shank, B, which is left square when the implement is to be used with an ordinary bit-stock; but may be round, or of any other suitable shape, when it is to be used as a machine tool. The body, which is preferably of cast-iron, is formed with an elongated opening or slot, forming a longitudinal orifice through its middle, into which the tenon to be formed enters as the wood is cut away. Formed upon that end of the body opposite the shank are two lugs, C and D, to one of which, C, are pivoted two jaws, E and F, by means of a screw-bolt, $a$, which passes through them and through the lug. The jaw F carries a cutter, $b$, which is rendered adjustable vertically by means of a wedge-block, $c$, placed in a recess in the jaw beneath the cutter, and operated by an adjusting-screw, $e$. It is also provided with a lateral adjustment by means of the screw $e'$ passing through a projecting edge of the jaw, and bearing against the outer edge of the cutter, which is held firmly in position upon its bed by the screw $f$ passing through the jaw, and through slots in the adjusting-wedge and cutter, into the nut $h$, which is provided with a tongue entering the slot in the cutter and wedge. The jaw E is also pivoted to the lug C by the same bolt $a$ upon which the jaw F is hinged, and serves the purpose of a back rest and gage, against which the tenon bears while being cut to the desired form. Both jaws are provided with curved slots $k$, through which passes the screw-bolt $m$, having a strong nut, $n$, screwing down upon the lug D, through which the bolt also passes, thus enabling the operator to secure the jaws firmly in any position in which they may be placed. Upon the outer side of the jaws are marked two scales, so graduated that when the same figures upon each scale are brought to the center mark $o$, the size of the tenon cut by the implement will correspond with the figures upon the scale opposite the center mark. The axial line of the tenon will also correspond with that of the tool, thus preventing all wabbling and irregular cutting, a difficulty which has hitherto rendered the use of adjustable hollow augers almost impracticable. Secured to one side of the body A, within the elongated opening, is an adjustable stop, G, which is formed in two parts, clamped to each other and to the body by means of the screw $p$.

It will be observed that by loosening the screw $p$ the stop may be placed at any desired point in the length of the body, and there secured by tightening the screw, thus determining the length of the tenons to be cut.

Having thus described my invention, I claim as new, and desire to secure by Letters Patent, the following:

1. The adjusting-wedge $c$ and its screw $e$, in combination with the jaw F, cutter $b$, and its adjusting and holding screws $e'$ and $h$, substantially as and for the purpose specified.

2. The cutter-carrying jaw F and gaging-jaw E, provided with graduated scales and holding devices, as shown, in combination the body A and shank B, substantially as and for the purpose set forth.

3. The adjustable stop G, constructed in two pieces, clamped to each other and to the body A by the screw $p$, as and for the purpose specified.

In testimony that I claim the foregoing I have hereunto affixed my signature this 30th day of July, 1875.

ALBERT A. WOOD. [L. S.]

In presence of—
 N. E. ROBINSON,
 GEORGE S. BALLOCK.